Figure 3:
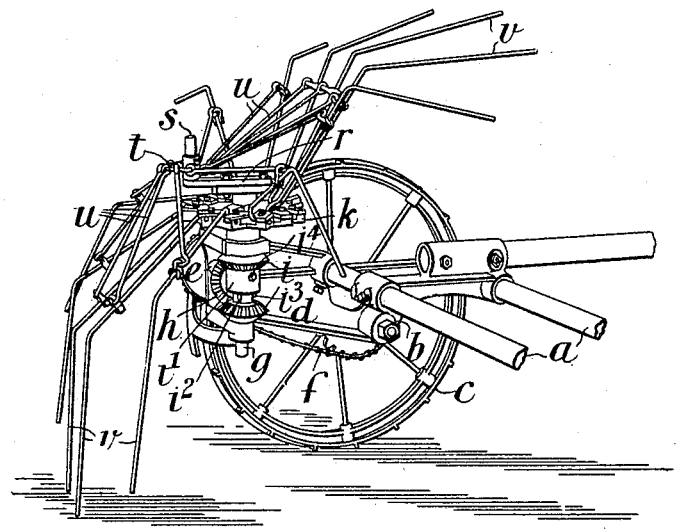

No. 784,540. PATENTED MAR. 14, 1905.
E. C. BLACKSTONE & R. E. WATTS.
SWATH TURNER.
APPLICATION FILED JULY 27, 1903.
2 SHEETS—SHEET 1.
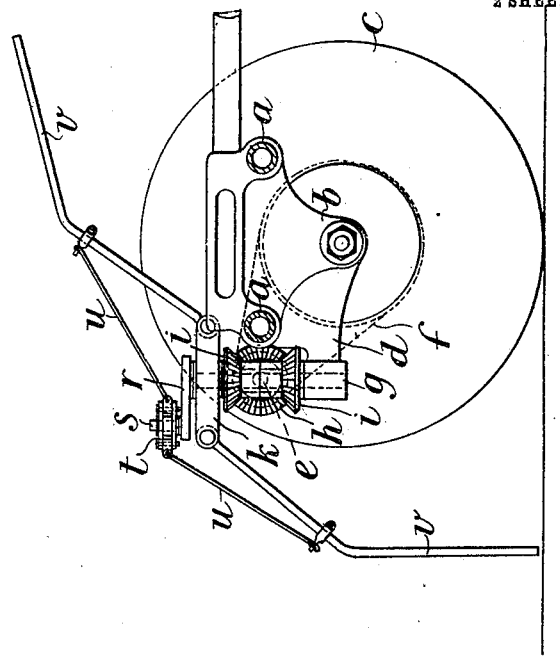
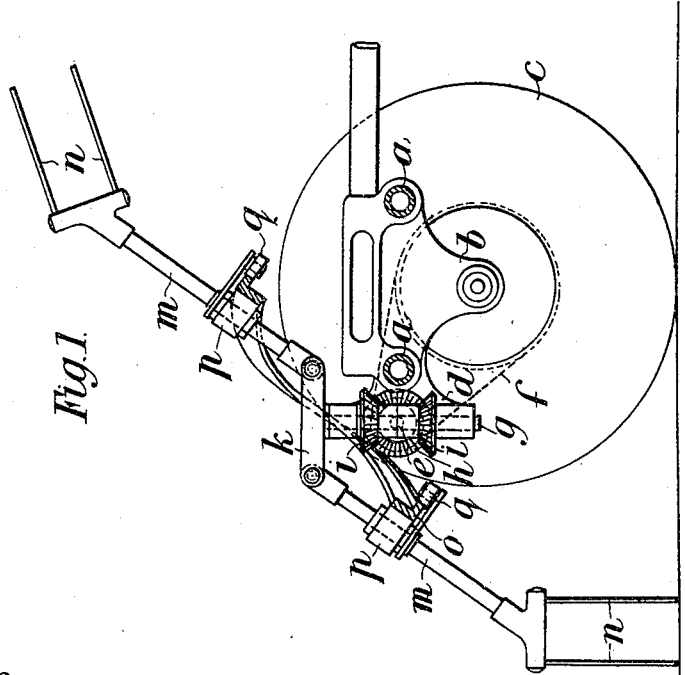
Witnesses
Inventors.

No. 784,540. PATENTED MAR. 14, 1905.
E. C. BLACKSTONE & R. E. WATTS.
SWATH TURNER.
APPLICATION FILED JULY 27, 1903.

2 SHEETS—SHEET 2.

Witnesses.
P. H. Hubbard
E. P. Jack

Inventors.
Edward C. Blackstone and
Richard E. Watts
By Whitaker & Prevost Attys No. 784,540.

Patented March 14, 1905.

UNITED STATES PATENT OFFICE.

EDWARD CHRISTOPHER BLACKSTONE AND RICHARD EDWARD WATTS, OF STAMFORD, ENGLAND.

SWATH-TURNER.

SPECIFICATION forming part of Letters Patent No. 784,540, dated March 14, 1905.

Application filed July 27, 1903. Serial No. 167,178.

*To all whom it may concern:*

Be it known that we, EDWARD CHRISTOPHER BLACKSTONE and RICHARD EDWARD WATTS, subjects of the King of Great Britain, residing at Rutland Engineering Works, Stamford, Lincolnshire, England, have invented new and useful Improvements in Swath-Turners, of which the following is a specification.

Our invention relates to swath-turners, and comprises the improvements hereinafter described.

According to our present invention, instead of employing oscillating forks, as described in the specification of British Letters Patent No. 15,644 of 1898, we employ for turning a swath a series of two or more forks or tines which are adapted to move continuously around a common axis and operate successively and which have arranged in conjunction with them means for controlling their movement while in contact with the swath and then lifting them from the ground and guiding them round to their starting position.

In the accompanying drawings, Figure 1 is a sectional side elevation illustrating one arrangement for carrying out our invention. Fig. 2 is a similar view illustrating a modification, and Fig. 3 is a perspective view of a portion of a machine like that illustrated in Fig. 2.

In the arrangement for carrying out our invention shown in Fig. 1 we provide a frame advantageously formed of tubes $a$ $a$, uniting end brackets $b$, carrying the axle of the traveling wheels $c$, and a front bracket (not shown) carrying a front steering-wheel having its standard designed for the attachment of draft-shafts. In a bracket $d$, carried by the frame, is a horizontal shaft $e$, which is driven from one or both of the driving-wheels $c$ through the medium of a sprocket-chain $f$ and gearing, the sprocket-wheel in connection with the driving-wheel $c$ being connected thereto by means of ratchet mechanism in a well-known manner. In combination with this horizontal shaft is a vertical shaft $g$, driven through the medium of bevel gear-wheels $h$ $i$ on the horizontal shaft and vertical shaft, respectively, the said vertical shaft carrying at its upper end a head $k$, to which the arms $m$ of the turning-forks $n$ are horizontally pivoted. If desired, the shaft $g$ may be more or less inclined. In practice the shaft $g$ carries a pair of bevel-wheels $i$ $i$ loose upon it and engaging with the bevel-wheel $h$ on the horizontal shaft, a sliding clutch upon the vertical shaft between the bevel-wheels $i$ $i$ or other suitable means being employed to fix one or the other of the said pair of wheels to the shaft $g$, according to the direction of rotation of the same, the other wheel being idle. This clutch, which is indicated at $i'$, Fig. 3, is adapted to slide upon a feather $i^2$ on the shaft $g$, and is provided at the ends with projections $i^3$, designed to engage with one or other of the wheels $i$ $i$ in a well-known manner. The clutch is held in either of its two positions by a set-screw $i^4$.

Adjacent to the head $k$ is a cam-path $o$, upon which rollers $p$ $p$ upon the fork-arms $m$ $m$ run, which cam-path is so arranged that the arms will act upon the swath to turn it over and then be lifted therefrom and guided round in a position to again act upon the swath. We prefer to employ in connection with the rollers $p$ $p$ other rollers $q$ $q$, running on the under face of the cam, so as to properly control the movements of the arms.

Instead of using a cam-path, as hereinbefore described, we sometimes substitute therefor the arrangement shown in Fig. 2, wherein an arm $r$ is fixed above the head $k$ and carries on a pin $s$ a rotating collar $t$, to which the arms $m$ are connected by radius-rods $u$ $u$. In this figure also we illustrate the arrangement wherein tines $v$ are employed instead of the arms $m$ $m$ and forks $n$ $n$ shown in Fig. 1.

We usually construct a machine with two complete sets of forks and driving mechanism to operate upon two swaths simultaneously or to turn two swaths into a windrow. When the frame of the implement is of such a construction that the axis of the vertical or inclined shaft may be placed immediately above the axis of the driving-wheels, the forks may be arranged to turn the rows either in advance of the driving-wheels or at the rear of the same by simply turning the cam-paths through an angle of one hundred and eighty degrees. In cases, however, where the construction of the frame does not permit of this we find it advantageous to arrange one set of the turning mechanism to operate in front of the driving-axle and the other set in the rear of the driving-axle.

It will be obvious that with the arrangement for altering the direction of rotation of the vertical shafts, as hereinbefore described, the arms may be arranged to turn from right to left or left to right or one in one direction and one in the other to form a windrow as desired.

Although in the drawings the head $k$ is represented as having only two arms connected to it, it is to be understood that a greater number may be used, if desired.

Having now particularly described and ascertained the nature of our said invention and in what manner the same is to be performed, we declare that what we claim is—

1. In a swath-turner, the combination with the main frame of a horizontally-rotatable part carried thereby, a series of rake-arms each of which is independently pivoted to said rotatable part by a horizontal pivot permitting the vertical movement of said arms, mechanism for rotating said rotatable part, mechanism for reversing the direction of rotation of said rotatable part and devices engaging said rake-arms between their points of pivoting and their outer extremities for raising and lowering the same during rotation, substantially as described.

2. In a swath-turner, the combination with the main frame of a horizontally-rotatable part carried thereby, a series of rake-arms each of which is independently pivoted to said rotatable part by a horizontal pivot permitting the vertical movement of said arms, mechanism for rotating said rotatable part, a vertical supporting pivot-pin arranged above and eccentric to said rotatable part, a rotatable collar on said pin and rods pivoted to said collar and connected to said rake-arms between their points of pivoting and their outer extremities, substantially as described.

EDWARD CHRISTOPHER BLACKSTONE.
RICHARD EDWARD WATTS.

Witnesses:
JOHN E. BOUSFIELD,
A. ALBUTT.